(12) United States Patent
Balasubramanian et al.

(10) Patent No.: US 12,010,546 B2
(45) Date of Patent: Jun. 11, 2024

(54) APPARATUS FOR SEAMLESS REALTIME TRANSITIONS ACROSS LTE/WI-FI

(71) Applicant: Celona, Inc., Cupertino, CA (US)

(72) Inventors: Srinivasan Balasubramanian, San Diego, CA (US); John Taylor, Cupertino, CA (US); Mehmet Yavuz, Palo Alto, CA (US); George Voon, Cupertino, CA (US)

(73) Assignee: Celona, Inc., Campbell, CA (US)

( * ) Notice: Subject to any disclaimer, the term of this patent is extended or adjusted under 35 U.S.C. 154(b) by 0 days.

(21) Appl. No.: 17/560,858

(22) Filed: Dec. 23, 2021

(65) Prior Publication Data

US 2022/0217573 A1 Jul. 7, 2022

Related U.S. Application Data

(60) Provisional application No. 63/130,357, filed on Dec. 23, 2020.

(51) Int. Cl.
*H04W 28/02* (2009.01)
*H04L 12/46* (2006.01)
(Continued)

(52) U.S. Cl.
CPC ..... *H04W 28/0268* (2013.01); *H04L 12/4633* (2013.01); *H04L 47/2416* (2013.01);
(Continued)

(58) Field of Classification Search
None
See application file for complete search history.

(56) References Cited

U.S. PATENT DOCUMENTS

2010/0061232 A1* 3/2010 Zhou ............... H04W 12/06
370/230
2014/0201814 A1* 7/2014 Barkie ............. H04L 63/0892
726/4

(Continued)

OTHER PUBLICATIONS

Arash Molavi Kakhki, et al. 2015. Identifying Traffic Differentiation in Mobile Networks. In Proceedings of the 2015 Internet Measurement Conference (IMC '15). Association for Computing Machinery, New York, NY, USA, 239-251. https://doi.org/10.1145/2815675.2815691 (Year: 2015).*

(Continued)

*Primary Examiner* — Andre Tacdiran
(74) *Attorney, Agent, or Firm* — JAQUEZ LAND GREENHAUS & McFARLAND LLP; Bruce W. Greenhaus, Esq.

(57) ABSTRACT

A method and apparatus for seamless real-time transitions across LTE and Wi-Fi networks are disclosed. The disclosed method and apparatus relate to determining which communications networks to use when communicating between a UE and a network within an Enterprise Network (EN). In some embodiments, a Communications Client Application (CCA) operates within a selected UE and a Communications Server Application (CSA) operates on the network side of the Enterprise Network. Both the CCA and the CSA act together in concert to coordinate the transmission of packets between the UE and the network using either LTE or Wi-Fi networks. For seamless communications, some embodiments use a single VPN tunnel through which to transmit data packets. In other embodiments, for seamless communications, two VPN tunnels are used, one for LTE packet transfers, and one for Wi-Fi packet transfers.

15 Claims, 9 Drawing Sheets

(51) Int. Cl.
  *H04L 47/2416* (2022.01)
  *H04L 47/2425* (2022.01)
  *H04W 40/12* (2009.01)
(52) U.S. Cl.
  CPC ..... *H04L 47/2425* (2013.01); *H04W 28/0236* (2013.01); *H04W 40/12* (2013.01)

(56) References Cited

U.S. PATENT DOCUMENTS

| | | | | |
|---|---|---|---|---|
| 2014/0369198 | A1* | 12/2014 | Rinne | H04W 40/02 370/235 |
| 2015/0350983 | A1* | 12/2015 | Kwok | H04L 65/1016 370/331 |
| 2016/0212695 | A1 | 7/2016 | Lynch et al. | |
| 2017/0230871 | A1* | 8/2017 | Rangaswamy | H04L 61/5007 |
| 2019/0132291 | A1* | 5/2019 | Zhao | G06F 9/45558 |
| 2020/0106699 | A1 | 4/2020 | Chauhan | |
| 2020/0187041 | A1* | 6/2020 | Hsu | H04L 65/612 |
| 2020/0296176 | A1 | 9/2020 | Bastide et al. | |
| 2020/0336484 | A1 | 10/2020 | Mahajan et al. | |
| 2021/0021518 | A1* | 1/2021 | Chand | H04L 45/021 |
| 2021/0021564 | A1* | 1/2021 | Chand | H04L 63/166 |
| 2021/0021565 | A1* | 1/2021 | Chand | H04L 61/2596 |

OTHER PUBLICATIONS

Network World. What is split tunneling? Here are the pros and cons. May 21, 2020. https://www.networkworld.com/video/103461/what-is-split-tunneling-here-are-the-pros-and-cons (Year: 2020).*

Heintzkill, Ross. What is Split Tunneling with Virtual Private Networks? Nov. 19, 2020. https://www.cbtnuggets.com/blog/technology/networking/what-is-split-tunneling-with-virtual-private-networks (Year: 2020).*

Rodriguez, Kari, International Search Report and Written Opinion received from the USPTO dated May 13, 2022 for appln. No. PCT/US2021/065089, 11 pgs.

* cited by examiner

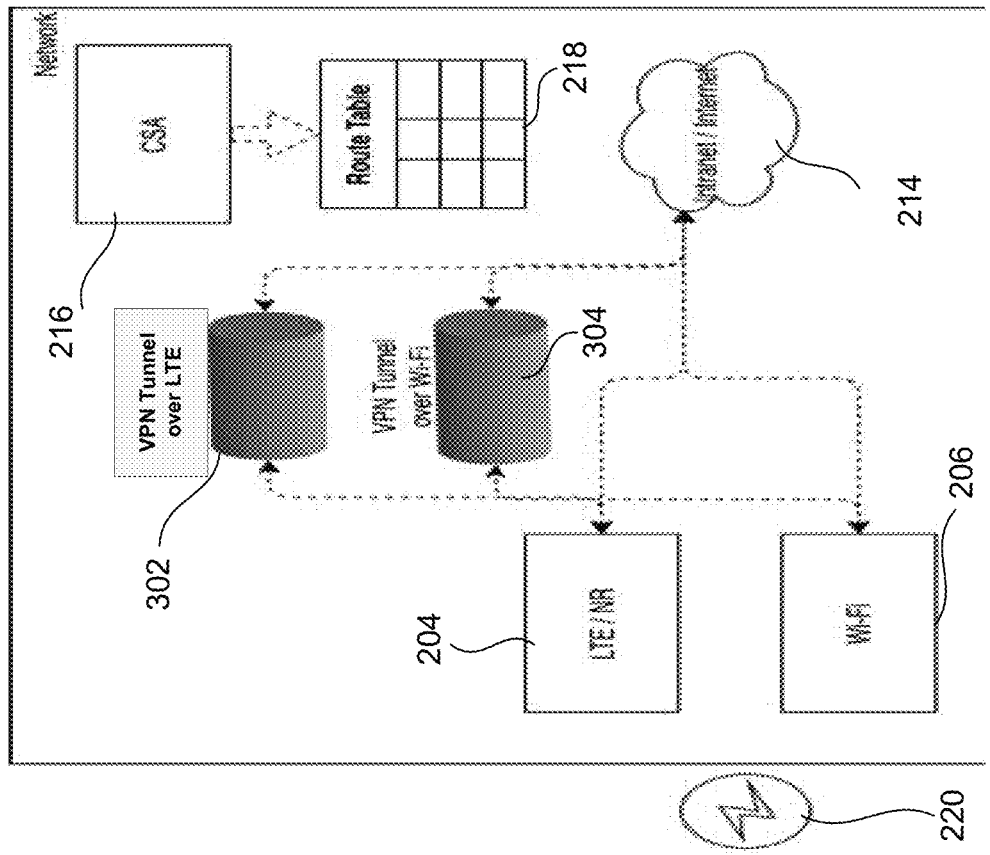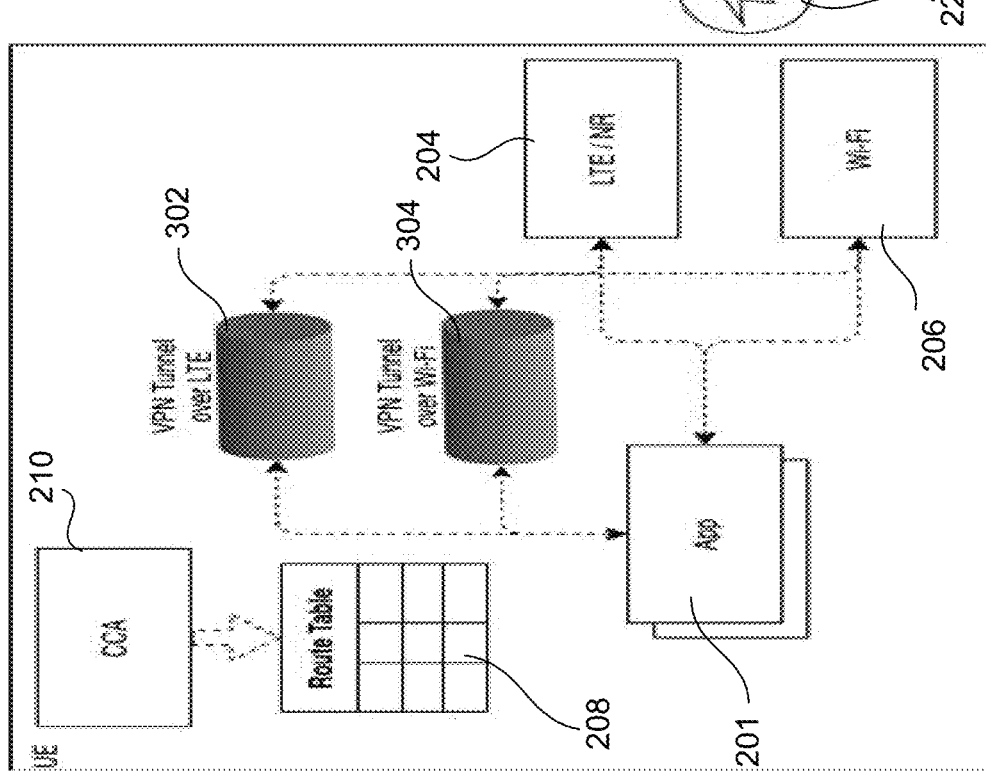
FIG. 3

| Traffic type | Typical applications | Dominant QoS metrics |
|---|---|---|
| Non-realtime Interactive | - Web browsing | - Latency (<1000 ms)<br>- Throughput (>1Mbps) |
| Realtime Interactive | - Video conference (with and without hidden buffering)<br>- Gaming<br>- Robot control | - Latency (<100ms for 100% of the packets)<br>- Jitter / Absolute Jitter (<50ms)<br>- Packet loss (<1%)<br>- Minimum guaranteed bit rate (>1Mbps) |
| Video streaming | - YouTube<br>- Netflix<br>- Amazon | - Minimum guaranteed bit rate (>20 Mbps for 50% and 2 Mbps 100%)<br>- Bounded latency (<5000 ms) |
| Background | - Email<br>- File transfers | - Minimum guaranteed bit rate (>1Mbps) |

FIG. 6

APPARATUS FOR SEAMLESS REALTIME TRANSITIONS ACROSS LTE/WI-FI

This utility application claims priority under 35 USC section 111 (b) and under 35 USC section 119 (e), to earlier-filed provisional application No. 63/130,357 filed Dec. 23, 2020, entitled "Method and Apparatus for Seamless Realtime Transitions Across LTE-WI-FI"; and the contents of the above-cited earlier-filed provisional application (App. No. 63/130,357) is hereby incorporated by reference herein as if set forth in full.

BACKGROUND

(1) Technical Field

The disclosed method and apparatus generally relate to establishing a communication link to a communications network. In particular, the disclosed method and apparatus relate to assisting user equipment (UE) to transition between connections to a Long Term Evolution (LTE) and a Wi-Fi network. Even more specifically, the disclosed method and apparatus relate to determining which communications networks to use when communicating between a UE and a network within an Enterprise Network (EN).

(2) Background

FIG. 1 shows a basic configuration for a communication network 100, such as a "4G LTE" (fourth generation Long-Term Evolution) or "5G NW" (fifth generation New Radio) network, in which user equipment (UE) 101 communicates with a base station/access point (BS/AP) 103. The term UE refers to a wide array of devices having wireless connectivity, such as a cellular mobile phone, Internet of Things (IoT) device, virtual reality googles, robotic device, autonomous driving machine, smart barcode scanner, and communications equipment. Communications equipment includes desktop computers, laptop computers, tablets and other types of personal communications devices.

Throughout this disclosure, the term BS/AP is used broadly to include at least an eNB (Evolved Node B or E-UTRAN Node B) of a 4G network or gNB (5G node B) of an LTE/5G network, a cellular base station (BS), a Citizens Broadband Radio Service Device (CBSD), a Wi-Fi access node, a Local Area Network (LAN) access point, a Wide Area Network (WAN) access point, etc. and should also be understood to include other network receiving hubs that provide wireless access to a network via a plurality of wireless transceivers.

A Radio Access Technology or (RAT) is the underlying physical connection method for a radio based communication network. Many UEs support several RATs in one device, such as Bluetooth, Wi-Fi, and GSM, UMTS, LTE or 5G NR.

Currently, UEs prefer Wi-Fi over LTE. In Enterprise deployments (deployments in Enterprise Networks (ENs)), the preference is to leverage LTE over Wi-Fi given the higher Quality of Service (QoS) offered by LTE networks. Additionally, the UE does not aggregate the traffic based on the type of application over LTE and Wi-Fi, even when the UE is associated with both an LTE and Wi-Fi networks simultaneously. Such separation is supported only for Internet Packet Data Networks (PDNs) versus IP Multimedia Subsystem (IMS) PDN connections across the two RATs and not within an Internet type application that are connected to a single PDN. While some solutions for using VPN connectivity to provide seamless connectivity exist, these are largely heavy weight and do not allow for "make-before-break" operation to minimize the transition times across the LTE and Wi-Fi networks. Exemplary solutions are provided by Netguard, NCP, Strongswan and Wirelguard. However, these solutions do not achieve the technical advantages and characteristics of the present method and apparatus providing seamless real-time transitions of traffic across enterprise EN-LTE and Wi-Fi with both Radio Access Technologies (or "RATs") deployed in an enterprise network (EN).

Technical Advantages Achieved by Allowing Seamless Real-Time Transmissions in an Enterprise Network for LTE/Wi-Fi Transitions It is therefore desirable to provide a method and apparatus providing "seamless" transition of traffic across enterprise EN-LTE and Wi-Fi with both Radio Access Technologies (or "RATs") deployed as enterprise network (EN) solutions. It is desirable that interruptions in communications be less than 1 second in duration. Whenever possible, "make-before-break" transitions should be supported by the method and apparatus for seamless real-time transitions across EN LTE and Wi-Fi.

In order to achieve the objectives of the present method and apparatus for seamless real-time transitions between LTE and Wi-Fi communications in an Enterprise Network (EN), it is desirable to allow for aggregating traffic across enterprise-LTE and Wi-Fi when coverage for both RATs are available. It is also desirable to allow for prioritizing traffic over EN-LTE or Wi-Fi based on at least one or more of the following criteria:

1) The application preference;
2) The Signal strengths of the LTE and Wi-Fi networks;
3) The congestion levels on the LTE and Wi-Fi networks;
4) Allowing specification of the applications that require seamless connectivity and other applications for which seamless connectivity may be optional;
5) Minimizing or reducing the compute and packet overheads based on the choice of the solutions and selectively enabling seamless connectivity based on the application;
6) Allowing for Enterprise-IT to control the device configuration;
7) Developing the required support for a smartphone Communications Client Application (CCA) and for the network servers' Communications Server Application (CSA) deployed in an Enterprise Network (EN) on an enterprise campus to enable seamless connectivity; and
8) Allowing for recognition that the UE is operating on a CBRS enterprise network.

In order to achieve the above enumerated desirable technical advantages and characteristics of a method and apparatus providing seamless real-time transitions of traffic across enterprise EN-LTE and Wi-Fi with both Radio Access Technologies (or "RATs") deployed in an enterprise network (EN), it is desirable to develop both a Communications Client Application (CCA) (typically residing in the UEs) and a Communications Server Application (CSA) (residing within the enterprise network and interfacing with the Intranet/Internet). As described in much more detail below, it is desirable that the CCA and CSA work in concert to achieve the goals and technical advantages of the present method and apparatus.

As described in much more detail below, on the Client side, which typically resides and operates within a UE, it is desirable to develop a smartphone Communications Client Application (CCA) that:

1) Supports two VPN tunnels, one each for seamless communications over LTE and Wi-Fi, and manage the routing tables to support using the appropriate VPN tunnel;
2) Allows for the user/enterprise-IT to specify the LTE and the Wi-Fi operating preferences for each application; and
3) Allows for the signal strength to be retrieved for the LTE and the Wi-Fi in real-time Briefly, it is also desirable to develop a smartphone Communications Client Application (CCA) that has the following additional capabilities:

4) Allows for detecting the congestion level over LTE and Wi-Fi networks
5) Provides support for regulating EUD traffic over the appropriate RAT based on the application priorities subject to signal strength and congestion experienced; and
6) Determines that the UE is operating on a CBRS Enterprise Network using specific signatures of the credentials.

On the server side, or the EN "network" side, it is desirable to develop an orchestration platform for the enterprise-IT to manage the devices via the (CCA) and from a Communications Server Application (CSA) that resides in the network. It is desirable to provide integration with the MDM platform and address aspects not covered by the MDM to provision policies for EUD behaviors. The management platform shall accommodate iOS and Android devices.

Briefly, it is desirable to develop a Communications Server Application (CSA) that:

1) provides a TIA for the VPN tunnel being established;
2) routes the packets on the DL (downlink) based on the preferences exercised by the CCA for routing the traffic on the UL (uplink) and reflects that on the DL.
3) encapsulates the packet delivered on the DL based on the outer IP address associated with the RAT over which the packet is to be sent; and
4) de-encapsulates the packet received on the UL by removing the outer IP address and forwarding the packet to the Intranet/Internet.

The present method and apparatus for seamless real-time transitions across EN LTE and Wi-Fi networks provides such desirable solutions.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 3 illustrates another embodiment in which the VPN tunnels to be supported over two RATs, each with an independent IP address.

FIG. 6 is a table showing the relationship between different types of traffic, particular typical applications, and the dominant QoS (Quality of Service) metrics associated with the different traffic types.

Figure 1:
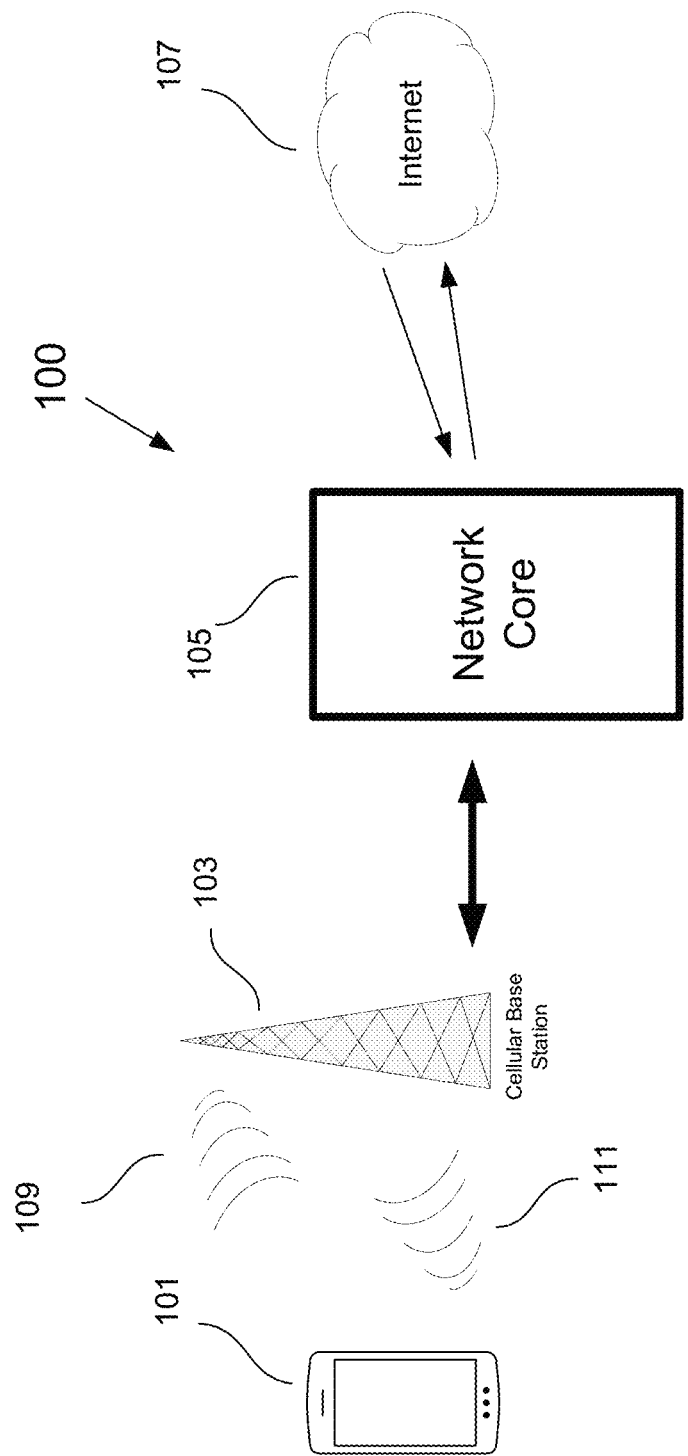
FIG. 1 shows a basic configuration for a communication network, such as a "4G LTE" (fourth generation Long-Term Evolution) or "5G NW" (fifth generation New Radio) network, in which user equipment (UE) communicates with a base station/access point (BS/AP).

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

The presently disclosed method and apparatus provides a UE application that supports two VPN tunnels, one each over LTE and Wi-Fi. In addition, the application manages routing tables to support using the appropriate one of these two virtual private network (VPN) tunnels. In addition, the application assumes an associated server application provides the same TIA (Tunnel Inner Address) based on a user identity for both of the VPN tunnels that have been established over the LTE network and the W-Fi network. In some embodiments, if two VPN tunnels cannot be supported, then the UE application supports transitioning the VPN tunnel from one RAT to the other. In some embodiments, the user/enterprise information technology personnel (enterprise-IT) specifies the LTE and Wi-Fi operating preferences for each application. In some embodiments, the default preference can be specified when no specification is provided for an application. In addition, the signal strengths are retrieved for LTE and Wi-Fi in real-time. The relative signal strength levels for transitioning the traffic across LTE and Wi-Fi can be specified. The relative signal strength can be specified independently for applications that require seamless transitions and other applications for which it is optional.

In addition, in some embodiments, a UE application allows detection of a congestion level over LTE and Wi-Fi networks. The UE application also allows the relative thresholds that require transitioning the traffic across LTE and Wi-Fi to be specified. Support for regulating EUD traffic over the appropriate RAT is provided based on the application priorities subject to signal strength and congestion experienced. Traffic can be sent: (1) directly over the LTE IP address: or (2) directly over the Wi-Fi IP address; or (3) over a VPN tunnel with the packet routed over LTE; or (4) over a VPN tunnel with the packet routed over Wi-Fi. The UE Application also determines whether the UE is operating on a CBRS enterprise network using specific signatures of the credentials. An initial assumption is made that the UE is always connected to the enterprise network and will not be associated with the Mobile Network Operator (MNO) network.

In addition to the UE application, a server application is disclosed that develops an orchestration platform for enterprise-IT to manage the devices via the UE application from the server application. The server application provides an integration with a mobile device management (MDM) platform and addresses aspects not covered by the MDM to provision policies for end user device (EUD) behaviors. In some embodiments, the MDM platform accommodates the iOS operating system and Android devices. The server application also provides a device provisioning platform that is based on the particular device original equipment manufacturer (OEM). In some embodiments, the UE application has a default configuration without explicit control from the server application.

Establishing VPN Tunnels for Communications Over Both the LTE and Wi-Fi Communications Paths Briefly, in some embodiments, the server application provides a Tunnel Inner Address (TIA) for the VPN tunnel being established. Once a VPN tunnel is established over the RAT (i.e., LTE/Wi-Fi), the server application provides the same TIA when the VPN tunnel is established with the same credentials on the other RAT (i.e., Wi-Fi/LTE).

In short, in some embodiments, the server application routes packets on the downlink (DL) (i.e., the link from the BS/AP to the UE) based on the preferences exercised by the UE application for routing the traffic on the uplink (UL) (i.e., the link from the UE to the BS/AP and reflects that on the DL. When a VPN tunnel is established over both LTE and Wi-Fi, the server application determines the least congested network on the DL for routing the packet over the appropriate RAT when the application is operating over the VPN tunnel. The server application encapsulates the packet delivered on the DL based on the outer IP address associated with the RAT over which the packet is to be sent. The server application de-encapsulates the packet received on the UL by removing the outer IP address and forwarding the packet to the Intranet/Internet.

Figure 2:
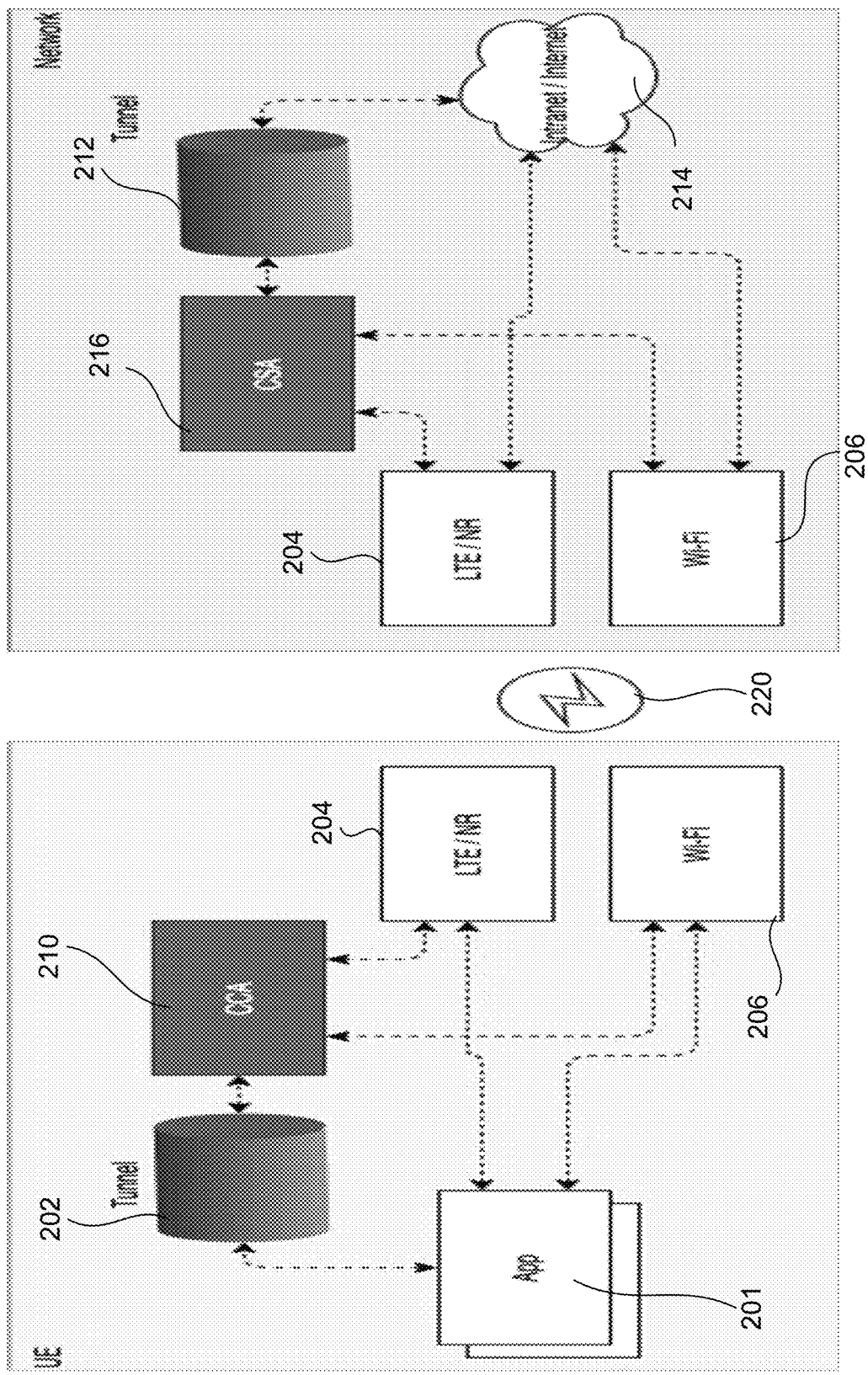
FIG. 2 is an illustration of one embodiment of the disclosed method and apparatus in which one VPN tunnel is provided for packets from an application within the UE to either use the path for packets for the LTE network or the path for packets for the Wi-Fi network.

As described in much more detail below with reference to FIGS. 2 and 3, in some embodiments, a single VPN tunnel is established (as shown in the embodiment of FIG. 2). In other embodiments, as described below with reference to FIG. 3, two VPN tunnels are established (one for communications over LTE and one for communications over Wi-Fi). Dynamic switching of the routes over LTE and Wi-Fi is provided. In some embodiments, an IPSec tunnel is established over either LTE/NR or over Wi-Fi. Based on the radio/congestion conditions, the UE application moves the VPN tunnel to the other technology when needed, moving the traffic through the VPN tunnel from LTE/NR to Wi-Fi or Wi-Fi to LTE/NR. In other embodiments, the VPN tunnel is established once and the routing of the packets over LTE/NR or Wi-Fi is dynamically chosen. Accordingly, some packets are exchanged over the LTE/NR and others over Wi-Fi, potentially simultaneously.

FIG. 2 is an illustration of one embodiment of the disclosed method and apparatus in which one VPN tunnel 202 is provided for packets from an application 201 within the UE to either the path for packets for the LTE/NR network 204 or the path for packets for the Wi-Fi network 206. In addition, a route table (not shown in FIG. 2) is managed by the UE CCA 210 (referred to herein as the Communications Client Application, or "CCA" 210 for short) to determine which application packets are to be routed from the UE application (or client application) 201, through the VPN tunnel 202, and to either the LTE network via the LTE/NR 204 or to the Wi-Fi network via the Wi-Fi communications device 206. The CCA 210 provides the routing of packets as necessary to accomplish the communications goals of the UE.

Similarly, on the network side, a single VPN 212 is shown coupled to the Communications Server Application (CSA) 216. In actuality, although two separate tunnels are shown in FIG. 2, the VPN tunnel 202, 212 actually comprises a single communications construct, and not two separate physical tunnels. The VPN tunnel 202, 212 is, in reality, a single VPN tunnel (communications construct or scheme) through which communications (packets of data) at the UE (and specifically from the UE App 201) are transmitted to the Intranet/Internet 214. The single VPN tunnel 202,212 provides the functions of a VPN communications connection between the CCA and the CSA, and between the UE App 201 and the Intranet/Internet Network 214, no matter how the packets are transmitted over-the-air between the UE and the Intranet/Internet Network 214. That is, no matter if packets are transmitted between the UE and the Network via the LTE-EN or via Wi-Fi, the VPN tunnel 202, 212 provides VPN tunnelling functionality between the UE and the Network. Route tables (not shown in FIG. 2) are managed by both the CCA 210 and the CSA 216 to determine which packets are to be routed through the VPN tunnel 202, 212 from the LTE/NR 204 and from the Wi-Fi device 206. The wireless communications link 220 is made over-the-air between the UE and the network.

FIG. 3 illustrates another embodiment in which the VPN tunnels to be supported over two RAT (i.e., LTE/NR and Wi-Fi) each with independent IP addresses, which will require an IPSec security context that cannot be supported with a single context. Under such scenarios, two independent VPN tunnels 302, 304 are established to communicate packets between the UE and the network. A first VPN tunnel 302 is used to transmit and receive packets between the UE and the network via LTE. A second VPN tunnel 304 is used to transmit and receive packets between the UE and the network via Wi-Fi. Both VPN tunnels 302, 304 are simultaneously established. The routing over the appropriate VPN tunnel 302 or 304 is dynamically handled (by both the CCA and CSA, acting in together in concert), and is, in some embodiments, based on the radio and congestion determinations in real-time. That is, the particular nature of the packets may influence which network the packets use (LTE or Wi-Fi) for transmission/reception, however, any of the packets can use either of the networks.

Route Selection Methods

In some embodiments of the present method and apparatus, route selection is performed in accordance with one of three main routing methods. For example, in accordance with some embodiments, a first (1) routing method is used that allows for independent route selections for the DL and the UL. The UL is decided by the UE and the DL is decided by the network. In some embodiments, the DL follows the route selection of the UL. In other embodiments, in accordance with this first of three possible methods, explicit, versus implicit, route selection choices from the client to the server are provided.

In accordance with a second (2) of three possible routing methods that may be used to practice the present method and apparatus, in some embodiments, packets are duplicated across LTE and Wi-Fi and the duplicate packets are removed at the receiver.

In accordance with a third (3) of the three possible routing methods that may be used to practice the present method and apparatus, in some embodiments, real-time metrics (per packet type & size/per flow/per application/UE/aggregate of a group of UEs) are used to make route selection decisions. Exemplary real-time metrics that may be used by this third (3) method may include the following real-time metrics:

Channel quality of RSSI on Wi-Fi and RSRP on LTE;
Channel occupancy;
Using throughput/latency/jitter/absolute-jitter/PER/ReTx counts/MCS & bitrate estimates from the LTE modem and the Wi-Fi modem in making route selection decisions;
Using passive traffic sensing and physical layer slot occupancy to determine the channel loading;
Using active probe requests/responses to determine the round-trip-delay; and
Assessing 'Quality Attenuation' both at the UE and in the Network and sharing the relevant information for route selection determination purposes.

When any of the three methods (1-3) described above are used, the methods can also use per-packet routing decisions in conjunction with any of the above-described methods. Per packet routing decisions are applicable and can be used with any of the three methods described above. For example, in some embodiments, the routing decisions are made to provide an 80% traffic on LTE and 20% of the traffic on Wi-Fi. The traffic exchanged on LTE and Wi-Fi can be based on the particular application (i.e., restricting access by a given application on one of the RATs). The traffic for a given flow can be aggregated on both LTE and Wi-Fi. In some such embodiments, estimates are made regarding the round-trip-delays on each link (LTE or Wi-Fi) in an effort to ensure a reduction or minimization of out-of-order packet being received at the receiver. In addition, no matter which of the above-described three routing methods are used to route packets between the network and the UE, another real-time metric that can be used in conjunction with any of the three routing methods is an association of route selection to meet the Service Level Agreements (SLAs) of specific flows.

Detailed Description of the Communications Client Application (CCA) in the UE

As shown in FIG. 3, the CCA is an application which operates within the UE to allow the establishment of at least one VPN tunnel (such as the VPN tunnel 302) which facilitates seamless communication between the UE and the network (and more specifically between the UE (or client) App 201 and the Intranet/Internet 214) using either the LTE or Wi-Fi networks. Both the CCA and the CSA create the VPN tunnels and control the coordination of them during transmissions between the UE and the network. The VPN tunnels are established by both the CCA and the CSA, acting together, in concert, using headers specific for the VPN tunnels, etc. Both the CCA and the CSA must allow for the UE operating a private Enterprise Network (EN), or CBRS EN, also referred to as a Private LTE and Private NR (PNR).

The CCA controls the routing of App 201 packets using its associated route table 208. In coordination with the network's CSA 216 and the CSA's manipulation of its associated route table 218, the CCA manipulates its associated route table 208 to ensure that packets reach their correct destination. The CCA also controls which App 201 packets use the one VP tunnel (of FIG. 2) or the two tunnels (of FIG. 3) and controls which network (LTE or Wi-Fi) to transmit the packets to the network via the wireless communications link 220 between the UE and the network.

Referring again to FIG. 2, in some embodiments, when it comes to determining whether to communicate using the LTE or the Wi-Fi networks, there is only one "master" and one "slave" allowed for communications on the different network. If packets are transmitted on the uplink using the LTE link, then the network transmits packets back to the selected UE using LTE. If packets are transmitted on the uplink using the Wi-Fi communications network, then packets are transmitted by the network to the UE using Wi-Fi. The same is true on the downlink. If packets are transmitted by the network on the downlink using the LTE link, then the UE transmits packets back to the network using LTE. If packets are transmitted on the downlink to the selected UE using the Wi-Fi communications network, then packets are transmitted by the UE to the network using Wi-Fi. An interesting aspect of this master/slave protocol arises when one of the two communication entities is using LTE or Wi-Fi, and it receives a packet over LTE from its master, how that communication entity knows to transmit back packets using LTE even if it was previously using Wi-Fi. This issue is solved by an abstraction that is built into the communication process. For example, the UE application (for example, the UE App 201 of FIG. 2) uses the IP address assigned to the VPN tunnel 202 (or obtained by the VPN tunnel 202 from the CCA 210). As described below in more detail, the VPN 202 assigned IP address comprises both an Inner IP address and an Outer IP address.

The entirety of the Outer and Inner packet transmitted by the UE App 201 (for example) or by the Intranet/Internet 214 (of FIG. 2) is described in more detail below with reference to FIG. 9. The TIA (tunnel inner address), also referred to in FIG. 9 as the "App assigned IP address" is enveloped within the Outer packet IP address for routing purposes.

For a given application (such as application 201 of FIG. 2), the VPN tunnel IP address (for example, the IP address of the VPN tunnel 202 shown in FIG. 2) remains the same whether communications take place on the LTE or the Wi-Fi networks (for that given application). The tunnel inner address (TIA) remains the same for a selected application running on the UE. The IP address associated with a packet has a port associated with it (either an LTE or Wi-Fi port), which instructs the packet to communicate using either the LTE or Wi-Fi network.

Figure 9:
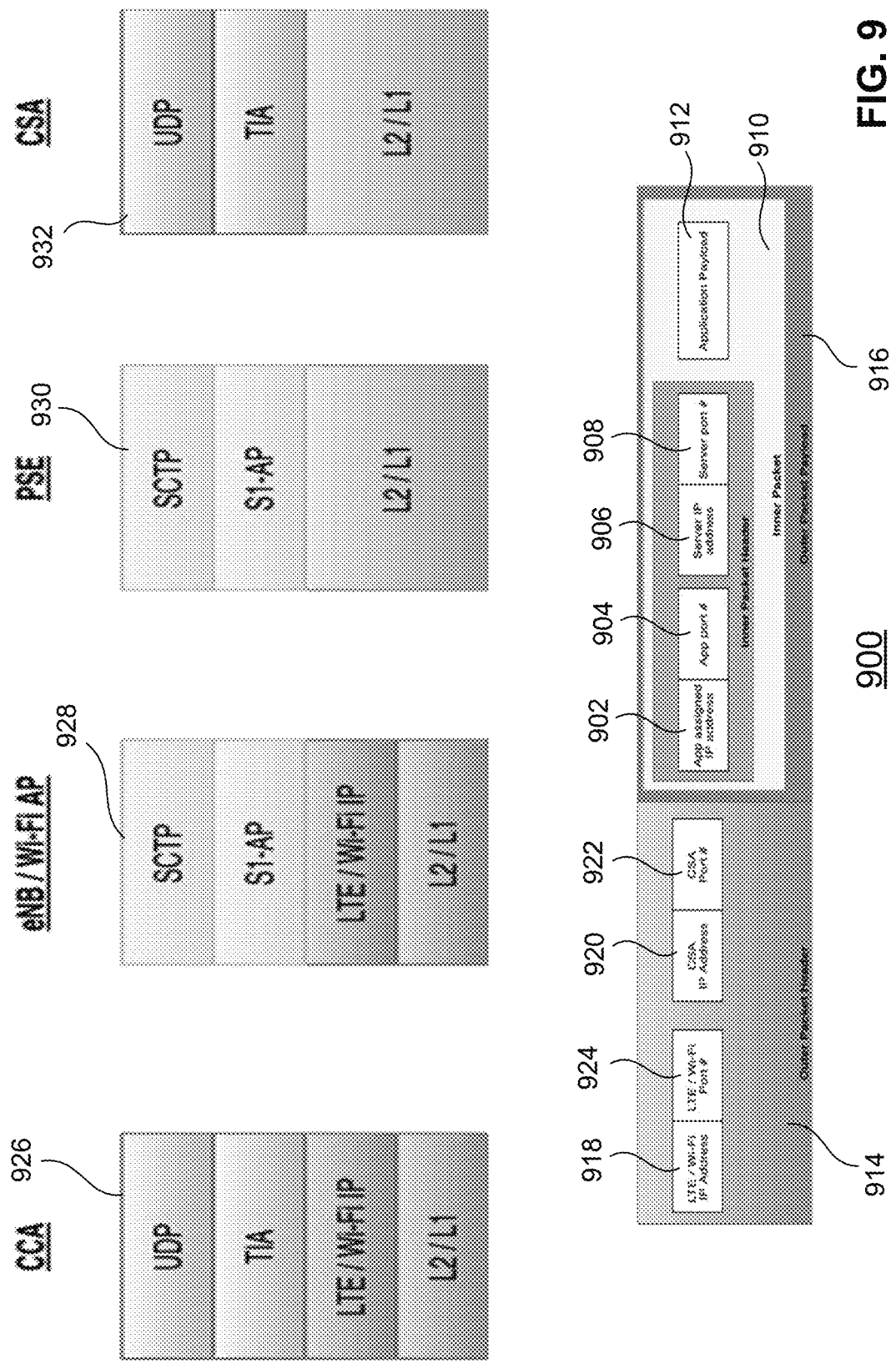
FIG. 9 shows details of the Outer and Inner packets, and their sub-components, and FIG. 9 also shows the various transmission protocol layers in accordance with the present method and apparatus.

Tunnel Inner Address (TIA), Inner Packet Header, Inner Packet, Outer Packet Headers and Outer Packet Payload Used in the Transmission of Packets FIG. 9 shows details of the Outer and Inner packets, and their sub-components, and FIG. 9 also shows the various transmission protocol layers in accordance with the present method and apparatus.

Referring now to FIG. 9, the inner packet header is generated within a selected UE (or by the server on the network side) and more specifically by the Apps (such as App 201 of FIG. 2) running on the UE. As shown in FIG. 9, the inner packet header comprises the TIA (also referred to as the "App assigned IP address" 902, the App Port 904, the Server IP address 906, and the Server Port number 908. The remainder of the inner packet 910 comprises the Application payload 912. The inner packet 910 becomes part of the Outer packet payload 916. As shown in FIG. 9, the inner packet 910 is "graphed" onto an Outer Packet Header 914. In some embodiments, for example, the UE, and specifically the CCA 210, creates the Outer Packet Header 914 and graphs it onto the Inner packet 910 and the outer packet payload 916.

As shown in FIG. 9, in some embodiments, the outer packet header 914 comprises the IP address for the LTE and the Wi-Fi 918, the CSA IP address 920, the LTE/Wi-Fi port #924 and the CSA port #922. The CSAs IP address is pre-provisioned and known by the CCA 210. The CCA 210 therefore knows where to send packets sent by the App 201 to be delivered to its associated CSA 216. The same thing happens in the reverse direction when the Intranet/Internet network 214 transmits packets to the UE. The outer packet header 914 is graphed onto (or enveloped with) the inner packet 910 to form a single packet, comprising the outer packet header 914 and the outer packet payload 916. In uplink communications between the UE and the network, the combined packet (comprising the outer packet header 914 and the outer packet payload 916) is sent by the CCA 210 to the CSA 216.

The packets sent from the UE by the App 201 do not address IP addresses in the Intranet/Internet 214 directly. Rather, the packets are wrapped (by the CCA 210 in UE generated packets, and by the CSA 216 in network generated packets) into the larger packets shown in FIG. 9 comprising the outer packet header 914 and the outer packet payload 916. Only these larger packets are transmitted between the two entities (UE or network) over the wireless communications link 220. The larger packets are unwrapped by the CCA (for packets sent to the UE) and by the CSA (by packets sent to the network). The outer packet headers 914 only contain sufficient information to address either the CCA 210 or the CSA 216. Once the outer packet headers 914 are removed (by the CCA 210 or the CSA 216) from the larger outer packet, the inner packet 910 contains sufficient information to direct the payload 912 to the correct Application (for example, the App 201) (for packets transmitted to the UE) or to the correct IP address on the Intranet/Internet 214 (for packets transmitted to the network). Note, that an application running on the UE (for example, the App 201) sees only a single, only one IP address. This is true whether it is routing its application payload 912 over the LTE network or the Wi-Fi network. This is true for the single VPN tunnel embodiment shown in FIG. 2 and the two VPN tunnel embodiment of FIG. 3. Consequently, the Tunnel Inner Address (TIA) (shown as the App assigned IP address 902 in FIG. 9) is assigned by the App. This IP address remains the same whether the App's packet is routed over the LTE network or the Wi-Fi network (or whether the App's packet is routed over the VPN tunnel over LTE 302 or the VPN tunnel over Wi-Fi 304 shown in the two VPN tunnel embodiment of FIG. 3).

FIG. 9 also shows the protocol stacks for the CCA protocol stack 926, the eNB/Wi-Fi Access Point (AP) protocol stack 928, the PSE protocol stack 930, and the CSA protocol stack 932. These network protocol stacks 926-932, inclusive) are used in transmissions of packets between the CCA 210 and the CSA 216 (see, e.g., FIG. 2 and FIG. 3).

Network Architecture for Tunnel Integration

Figure 8:
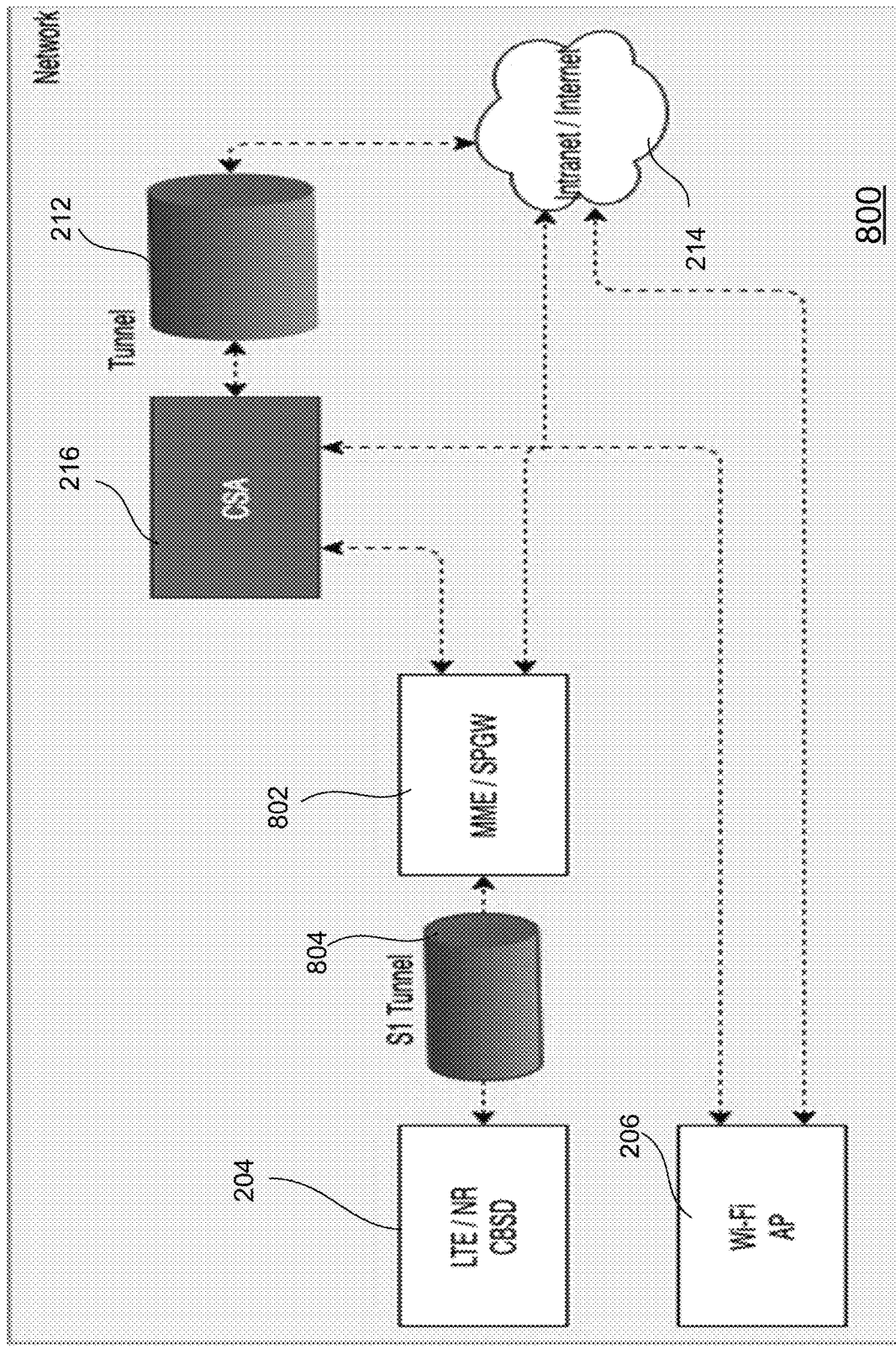
FIG. 8 shows a network architecture for Tunnel Integration that may be used in some embodiments of the present method and apparatus.

FIG. 8 shows a network architecture for Tunnel Integration 800 that may be used in some embodiments of the present method and apparatus. In the network architecture 800 shown in FIG. 8, it is important to note that the CSA 216 is placed "behind" the EPC Core (also known as the 5GC) 802. Also note that an Si Tunnel 804 is positioned between the EPC Core 802 and the LTE/NR CBSD 204. The remainder of the network architecture for tunnel integration 800 is analogous to the architectures shown in FIG. 2 and FIG. 3. The CSA 216 communicates through the VPN tunnel 212 when sending packets to the Intranet/Internet 214. The LTE/NR CBSD and Wi-Fi AP, 204 and 206, respectively, behave the same as their analogous components described above with reference to FIG. 2 and FIG. 3. The CSA 216 determines whether to route packets transmitted by the network 214 through the LTE 204 or through the Wi-Fi AP 206, as described above. The CSA 216 has a common IP domain that is able to see both the EPC Core (5GC) 802 and the Wi-Fi AP 206. The CSA 216 must be able to route packets to both the EPC Core 802 and/or the Wi-Fi Access Point (AP) 206. The CSA 216 sits in an "IP Domain". Both the EPC Core (5GC) 802 and the Wi-Fi Access Point (AP) 206 are routable in a single IP Domain. The CSA 216 can communicate with both the EPC Core 802 and the Wi-Fi Access Point (AP) 206. The two components (EPC Core 802 and Wi-Fi Access Point (AP) 206 cannot be in completely different VLANs. If they are, then the disclosed method and apparatus cannot function properly in an Enterprise Network environment.

Referring again to FIGS. 2 and 3, it is important to note that not all communication types need to use the VPN tunnels (such as the VPN tunnel 202, 212 of FIG. 2; or the VPN tunnels 302 and 304 of FIG. 3) to send and receive their packets. The VPN tunnels are used only to communicate "seamless" communication types between the UE and the network. Stated in other words, the VPN tunnels are used when the network must ensure that a "make before break" communication is established and maintained during packet transmissions. Exemplary seamless communication types include video teleconferencing, voice communications, video communications, such as "Zoom" teleconferencing. All of these seamless communication types are ongoing and it is desirable to make them seamless (that is, occurring without interruptions or breaks in communication). These seamless communication types must be routed through the VPN tunnels shown in FIGS. 2 and 3. Exemplary communication types not requiring routing through the VPN tunnels of FIGS. 2 and 3 are: web browsing, email communications. For these communication types, even if the transmission is interrupted, or "breaks" and "remakes", the interruption will occur without disrupting the communication (that is, nobody will notice the break in communications, and it will essentially have not affect on the communication quality. For these types of communication types, there is no need to route packets through the VPN tunnels shown in FIGS. 2 and 3. These types of communication do not need to be seamless.

Signal Strength Measurement Procedures in Accordance with the Present Method and Apparatus In typical embodiments of the presently disclosed method and apparatus, decisions of whether to switch between LTE communications and the Wi-Fi communications are largely determined by signal conditions on those networks and by the received signal strength measurements of transmissions over those networks as measured by the Wi-Fi and LTE modems. In accordance with the present methods for signal strength measurements some formulas are used to implement the methods. Exemplary formulas are as follows:

$R\text{-hist}=R\text{-hist}*\text{alpha}+R\text{-inst}*(1-\text{alpha})$

Hysteresis is typically built into the signal strength reports from the LTE/Wi-Fi modems Collect measurements from LTE/Wi-Fi every
$T_{MeasurementInterval}(\text{default}=100 \text{ ms})$ Check the Range #association remains consistent for
$N_{MeasurementInterval\text{-}LeaveLTE}$ (default=20)/
$N_{MeasurementInterval\text{-}EnterLTE}$ (default=5) before
switching the LTE/Wi-Fi preference Enhancement: will be looking at the falling and raising slopes to detect walk-in/walk-away for a better prediction.

The most important aspect of this signal strength measurement procedure is that it is preferably, in some embodiments, is that the signal strength measurements are obtained approximately every 100 ms. Also, an exponentially averaged value of the obtained LTE and Wi-Fi signal strength measurements should be used. This allows the Wi-Fi/LTE modems or networks to "go bad", or "go down" and be used in a more consistent manner before they are dropped. Sudden drops in Wi-Fi/LTE signal strengths do not require a transition from one (such as Wi-Fi) to the other (such as LTE). The goal is to reliably be able to predict if the Wi-Fi or the LTE has indeed gone "soft" or has degraded. This allows the network designers to detect rising and falling slopes in the LTE/Wi-Fi signal strengths. This aspect of the current disclosed method and apparatus allows for more predictability and more accuracy in assessing when to transition between the Wi-Fi and LTE networks.

We also do not want the signal strength measurements to be too correlated with one another. Consequently, it is not advisable to perform these signal strength measurements to close together in time (that is, to perform the measurements too frequently). On the other hand, it is not advisable to perform these signal strength measurements too far apart in time (too infrequently). The goal is to follow "shadowing", and not follow "fast fade". "Shadowing" occurs when a trend in data is followed in signal measurements. The preferred approach is to follow trends in signal strength measurements, and not to follow fading of signal strength measurements.

Table 1, shown below, shows signal strengths for LTE and Wi-Fi transitions when LTE is the preferred method of packet transmission over the wireless communications link 220 shown in both FIGS. 2 and 3 (the LTE preferred method is provisioned by a UE customer/user or a network provisioner). Both LTE and Wi-Fi are available for use, but LTE is preferred in the example shown in Table 1. LTE signal strengths comprise RSRP, while Wi-Fi signal strengths comprise RSSI. The operation of the VPN tunnel (or VPN tunnels shown in the embodiment described above with reference to FIG. 3) is described for three ranges of LTE/Wi-Fi signal strength measurements, labeled under the "Range" column as ranges #1, #2, and #3.

As shown in the second column of the first "range" #1, in some embodiments, LTE communications are preferred (as shown in the "tunnel operation" column) when the received signal strength exceeds −115 dBm. The UE should "camp on" the LTE network under these conditions. As shown in the tunnel operation column, although LTE is preferred, if possible, support for simultaneous operation over LTE and Wi-Fi should be provided. As shown in the tunnel operation column of the second range #2, Wi-Fi communications are preferred when the LTE received signal strength falls below −115 dBm and when the Wi-Fi signal strengths are as shown in the Wi-Fi signal strength (RSSI) column. Just as with range #1 however, as set forth in the tunnel operation column for range #2, although Wi-Fi is preferred in this case over LTE, if possible, support for simultaneous operation over LTE and Wi-Fi should be provided. In the third range (#3), the device is at an edge cell and the received LTE signal strength (RSRP) falls below −115 dBm. The Wi-Fi signal strength (RSSI) (as shown in the third column of Table 1) is below −82 dBM. Basically, in range #3, both of the received signal strengths for both LTE and Wi-Fi are bad. In this scenario, as shown in the tunnel operation column, LTE is preferred over Wi-Fi when these conditions are present.

In contrast to Table 1, Table 2, shown below, shows signal strengths for LTE and Wi-Fi transitions when Wi-Fi is the preferred method of packet transmission over the wireless communications link 220 shown in both FIGS. 2 and 3 (this Wi-Fi preferred method is provisioned by a UE customer/user or a network provisioner). Both LTE and Wi-Fi are available for use, but Wi-Fi is preferred in the example shown in Table 2. As described above with reference to Table 1, LTE signal strengths comprise RSRP, while Wi-Fi signal strengths comprise RSSI. The operation of the VPN tunnel (or VPN tunnels shown in the embodiment described above with reference to FIG. 3) is described for three ranges of LTE/Wi-Fi signal strength measurements, labeled under the "Range" column as ranges #1, #2, and #3.

TABLE 1

(signal strengths for LTE and Wi-Fi transitions when LTE is the preferred method of packet transmission)

| Ranges i | LTE Signal Strength (RSRP) | Wi-Fi Signal Strength (RSSI) | Tunnel Operation |
|---|---|---|---|
| #1 | Excellent: >−80 dBm<br>Good: −80 dBm to −90 dBm<br>Mid cell: −90 dBm to −115 dBm | Excellent: >−30 dBm<br>Good: −30 dBm to −67 dBm<br>Mid cell: −67 dBm to −82 dBm<br>Edge cell: <−82 dBm | Prefer LTE over WiFi<br>If possible, support simultaneous operation over LTE and Wi-Fi |
| #2 | Edge cell: <−115 dBm | Excellent: >−30 dBm<br>Good: −30 dBm to −67 dBm<br>Mid cell: −67 dBm to −82 dBm | Prefer WiFi over LTE<br>If possible, support simultaneous operation over LTE and Wi-Fi |
| #3 | Edge cell: <−115 dBm | Edge cell: <−82 dBm | Prefer LTE over WiFi |

TABLE 2

(signal strengths for LTE and Wi-Fi transitions when
Wi-Fi is the preferred method of packet transmission)

| Range | LTE Signal Strength(RSRP) | Wi-Fi Signal Strength (RSSI) | Tunnel Operation |
|---|---|---|---|
| #1 | Excellent: >−80 dBm<br>Good: −80 dBm to −90 dBm<br>Mid cell: −90 dBm to −115 dBm<br>Edge cell: <−115 dBm | Excellent: >−30 dBm<br>Good: −30 dBm to −67 dBm<br>Mid cell: −67 dBm to −82 dBm | Prefer WiFi over LTE If possible, support simultaneous operation over LTE and Wi-Fi |
| #2 | Excellent: >−80 dBm<br>Good: −80 dBm to −90 dBm<br>Mid cell: −90 dBm to −115 dBm | Edge cell: <−82 dBm | Prefer LTE over WiFi If possible, support simultaneous operation over LTE and Wi-Fi |
| #3 | Edge cell: <−115 dBm | Edge cell: <−82 dBm | Prefer WiFi over LTE |

As shown in the third column of the first "range" #1, in some embodiments, Wi-Fi communications are preferred (as shown in the "tunnel operation" column) when the received signal strength (RSSI) from the Wi-Fi exceeds −82 dBm. As shown in the tunnel operation column, although Wi-Fi is preferred, if possible, support for simultaneous operation over LTE and Wi-Fi should be provided. Said differently, the UE should "camp on" the Wi-Fi network when the measured Wi-Fi received signal strength (RSSI) exceeds −82 dBm. As shown in the tunnel operation column of the second range #2, LTE communications are preferred when the Wi-Fi RSSI is less than −82 dBm and the LTE RSRP are in the ranges shown in column 2 of Table 2 (LTE Signal Strength (RSRP)). Just as with range #1 however, as set forth in the tunnel operation column for range #2, although LTE is preferred in this case over Wi-Fi, if possible, support for simultaneous operation over LTE and Wi-Fi should be provided. In the third range (#3), the device is at an edge cell and the received LTE signal strength (RSRP) falls below −115 dBm. The Wi-Fi signal strength (RSSI) (as shown in the third column of Table 2) is below −82 dBM. Basically, in range #3, both of the received signal strengths for both LTE and Wi-Fi are bad. In this scenario, as shown in the tunnel operation column, Wi-Fi is preferred over LTE when these conditions are present. The UE should "camp" on the Wi-Fi network if these conditions exist.

Quality Attenuation ($\Delta Q$) and the Various ($\Delta Q$) Components

In some embodiments, 'Quality Attenuation' is assessed at both the UE and the network by sharing the relevant information for route selection. For the UE implementation, active traffic exchanged by the active applications is used to make the determination. For the network implementation, aggregate traffic from a given eNB and the extent of the Service Level Agreements (SLAs) being met is used to make determinations. For the purposes of this disclosure, quality attenuation ($\Delta Q$) is defined as a statistical measure that combines both the distribution of outcome completion time (e.g., packet latency) and the probability of an outcome failure (e.g., packet loss). Translocation is defined as the process of making information that is present at one location, available at another location. Quality of Experience (QoE) is defined as the overall performance at the services/application level from the user's perspective. Quality of service (QoS) is defined as a set of technologies (QoS mechanisms) that improve performance at the packet level from the network perspective.

Figure 4:
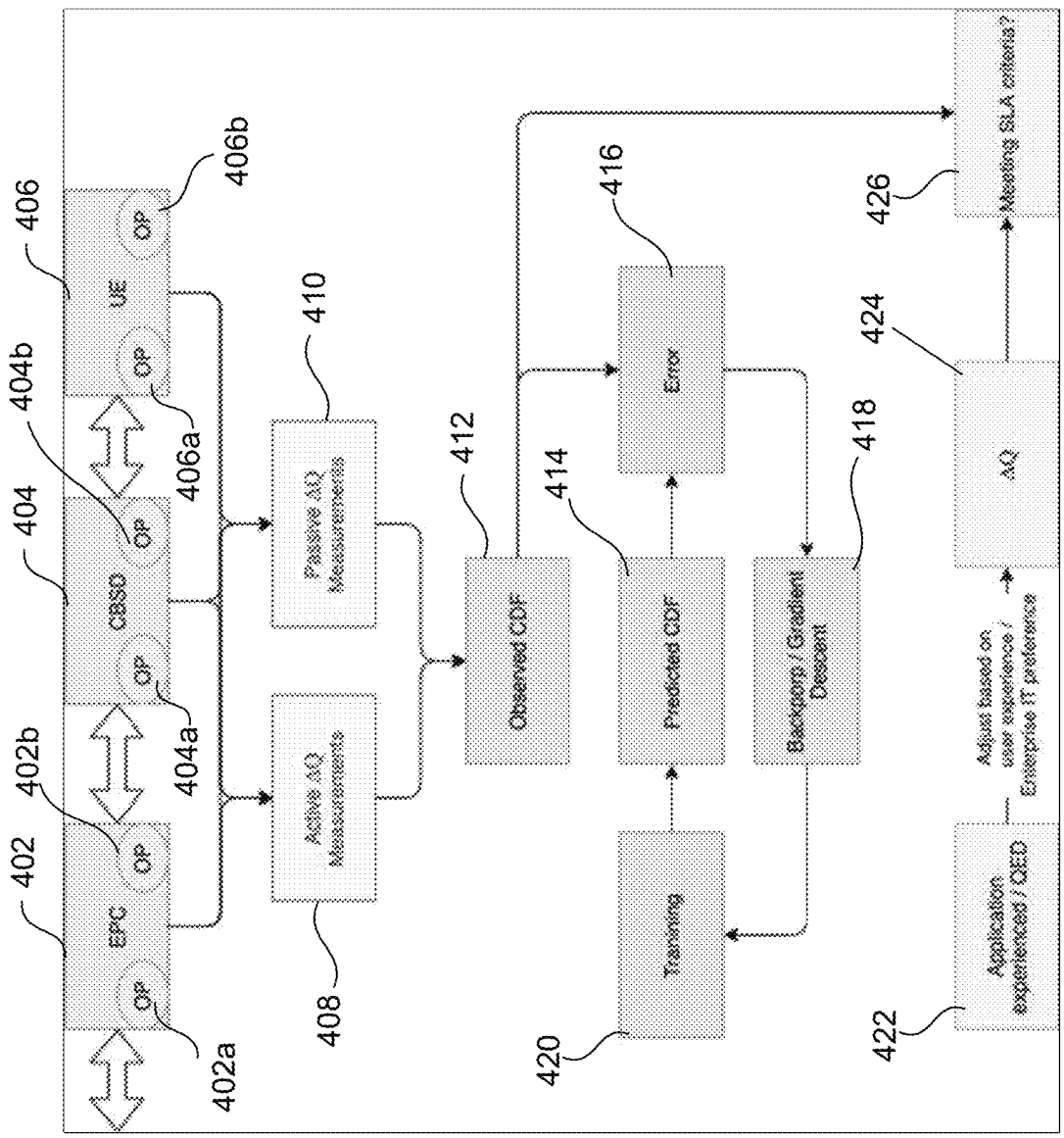
FIG. 4 is a flowchart of processes used to in connection with the assessment of Quality Attenuation.

FIG. 4 is a flowchart of processes used to in connection with the assessment of Quality Attenuation. The Quality Attenuation approach provides a means to take the bounded loss/delay approach of the industry specification TR-126 to the next level using a statistical measure of the attenuation of the translocation of a stream of packets when crossing a network. In some embodiments, this is sufficiently bounded for an application to deliver fit-for-purpose outcomes. The layering of network protocols isolates the application from any other aspect of the packet transport. FIG. 4 is described in more detail hereinbelow.

Figure 5:
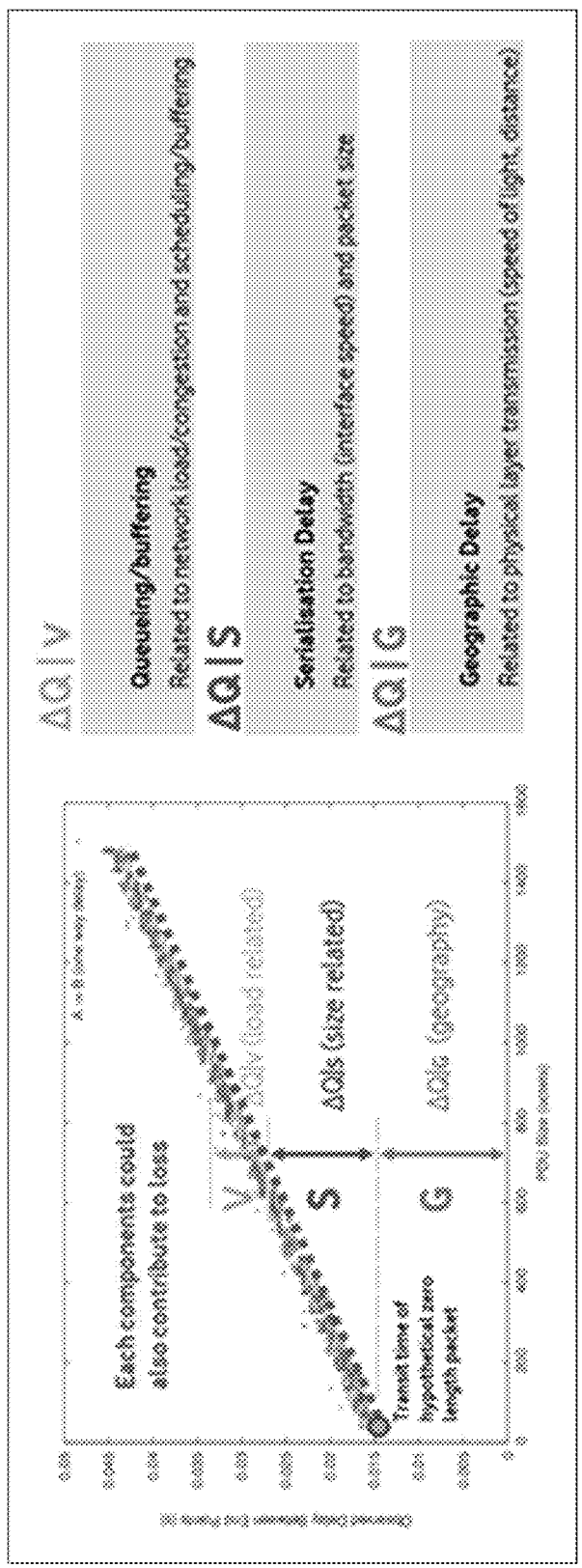
FIG. 5 illustrates three ΔQ components in a delay vs packet size scatter plot.

FIG. 5 illustrates three $\Delta Q$ components in a delay (observed delay of packets between endpoints "A"->"B") vs packet size (PDU size measured in "octets") scatter plot. More specifically, the scatter plot shows observed delays of packets between the endpoints (shown along the "y" axis) vs. packet size (PDU size in "octets") (shown along the "x" axis). The $\Delta QIG$ component, or "geographic delay" component, is related to the physical layer transmission (for example, the speed of light, distance transmissions must travel, etc.). The $\Delta QIG$ component tends to be relatively fixed, and does not vary over time. It remains fairly consistent. For the purposes of this disclosure, the $\Delta QIG$ component is defined as the distribution of inherent delay and probability of loss introduced by the path itself, which includes the time taken for signals to traverse the path. It can be thought as the minimum time taken for a hypothetical zero-length packet to travel the path. In many cases this is effectively constant for relatively long periods of time, in which case it can be represented by a single delay value. For typical broadband networks, a convenient unit is ms. If characteristics of the path result in a baseline loss rate that is independent of packet size, this is included here.

The next $\Delta Q$ component shown in FIG. 5 is the $\Delta QIS$ component. The $\Delta QIS$ component, or "serialization delay", is related to network bandwidth (interface speed) and packet size. The $\Delta QIS$ component reflects delays in packet transmissions due to the sizes of the packets that are transmitted. It is related to network bandwidth (interface speed) and packet size. It affects delays of packet transmissions caused by the sizes of the packets being transmitted. Smaller sized packets get delivered between endpoints much faster than do larger sized packets.

For the purposes of the present disclosure, the $\Delta QIS$ component is defined as the that part of quality attenuation, or $\Delta Q$, that is a function of packet size. This component incorporates things like serialization and de-serialization time. ΔQIS is a function from packet size to delay, which is usually monotonic and in many cases is broadly linear, in which case it can be represented by a simple slope parameter, with the dimensions of time/length. For current network interface speeds, a convenient unit is μs/byte. If characteristics of the packet transmission path result in a baseline loss rate that depends on packet size, for example due to a constant probability of corruption of each byte, this is included here.

The ΔQIV component causes delays that are related to network loading, congestion, and scheduling/buffering issues. Note that the line shown on the left of FIG. 5 is generally linear and shows that the delay of packets delivered between end points increases as the packet sizes increase. There is some variability in the delay for the same sized packets (because not all packets of the same size are identical) and this causes jitter which is shown as a smudged line on top of the line shown in the plot of FIG. 5. There is a variability in delay of packet transmission even for equally sized packets. This results in the jitter shown in the scatter plot of FIG. 5. For inelastic traffic flows, it is jitter (related to ΔQIV) and loss rate that are the aspects of quality attenuation that most impact the UX.

For purposes of the present disclosure, the ΔQIV component is defined as the distribution of delay and loss introduced by the fact that the network is non-idle, therefore it is affected by any other packets on the system, including those generated by the same application and user. This is modelled as a random variable, whose distribution may vary by time of day, etc. This can typically not be reduced to a single number, although moments of the distribution can be useful. The zeroth moment is the total probability, whose difference from one represents loss; the first moment is the mean variable delay, measured in seconds; the second central moment is the variance, whose square root is the standard deviation, also measured in seconds. Loss that results from competition for shared finite resources such as interface packet buffering is included here.

Mechanism of Applying Quality Attenuation

Some embodiments define traffic types and the associated metrics that are collected for the different traffic types that are transmitted. Expected behavior based on the different traffic types {% of traffic flows, meeting minimum thresholds} for the identified associated metrics are specified. Whether Service Level Agreements (SLAs) are met or not is measured based on comparing the collected data against the specified thresholds. A given flow type/microslice can be associated with one or more ΔQ Quantitative Timeliness Agreements (QTAs). This is QED (Quality Experience Delivered).

FIG. 6 is a table showing the relationship between different types of traffic, particular typical applications and the dominant QoS (Quality of Service) metrics associated with the different traffic types. If one measures transmission delays, and transmission delays only, these measurements capture the impact and effect of the various Quality Attenuation components described above. But as FIG. 6 shows, not all traffic types are the same, and therefore they have differing "dominant QoS" metrics associated with the different traffic types. Therefore, different metrics must be applied to different traffic types to accurately determine what a good delay metric is, what a bad delay metric is, what is bounded, etc., for each traffic type. Essentially it is important to create an accurate model that specifies an acceptable delay quantity for each traffic type—what amount of delay is acceptable and what amount of delay is unacceptable for a given traffic type. Also, as noted above with reference to the description of FIG. 8, it is important to note that not all communication or traffic types need to use the VPN tunnels (such as those shown and described above in the embodiments of FIG. 2 and FIG. 3. The VPN tunnels are used only to communicate "seamless" traffic types between the UE and the network. Exemplary seamless communication types such as video teleconferencing is shown in FIG. 6 as a "Real-time Interactive" traffic type. "Background" traffic types such as email and file transfer communications do not require seamless transmission of data.

Figure 7:
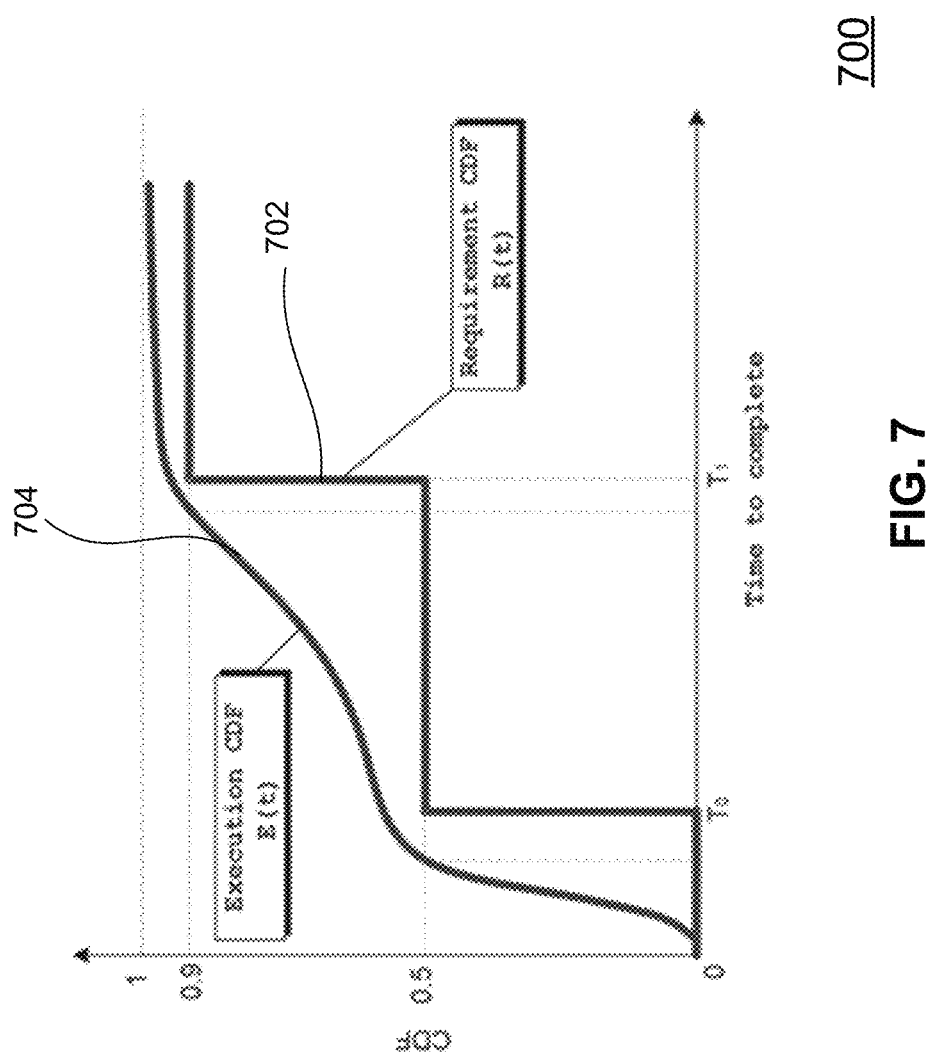
FIG. 7 is a plot of the time to complete vs. a Cumulative Distribution Function (CDF).

FIG. 7 is a plot of the time to complete vs. a Cumulative Distribution Function (CDF). Apart from real-time metrics and matching with the thresholds specified, a predictive approach is used to determining Quality Experience Delivered (QED). Based on collected data, the method and apparatus predictively looks at the current network conditions and the metrics collected, estimating the behavior based on adding other users/flows into the network and the potential impact that it will have on the SLAs. This prediction can be used to influence admission control and congestion control by adjusting the bits rate allowed for the QoS flows dynamically (when it is actively engaged in traffic). This allows for dynamic management and adaptability without having to rely only on configured parameters for the QoS flows based on the application.

This mechanism is to allow for regulating the users and types of users that will be allowed to use the specific type of resources on the network. This may result in the UE moving the LTE connection to the MNO network while retaining the Wi-Fi connection on enterprise connectivity.

In some embodiments, a more passive approach can be used in which traffic is blocked on a certain route for specific UEs. A UE can be restricted to using LTE, Wi-Fi, or LTE & Wi-Fi networks. Potentially, services are controlled to allow the use of LTE, Wi-Fi, LTE & Wi-Fi networks even for a given UE. It should be noted that the EN LTE and/or the MNO LTE might both be accessible by a UE when it is "on campus."

Referring again to FIG. 7, the plot 700 shows two "curves", a first "curve" 702, and a second curve 704. The first curve 702 represents a "requirement" CDF, or "R(t)", which represents thresholds of CDF that must be met in order for the observed CDF (represented by the second curve 704 in FIG. 7) to be deemed acceptable. Curve 704 plots the actual CDF values that are observed. In the case of transmission delays, curve 704 might show the actual Cumulative Distribution Function of the observed transmission delays between endpoints of users in an EN (for example, observed packet transmission delays over LTE-EN between a UE and a network). In the exemplary plot 700 of FIG. 7, fifty percent (or 0.5 on a scale of 0.0 to 1.0) of the CDF should have been completed (delivered if the CDF measures the CDF of packet delays) by time="T₀". In the example given in FIG. 7, the observed values shown in the curve 704 exceed this expectation, that is, more than fifty percent of packets were delivered by time="$T_0$". Similarly, in the exemplary plot 700 of FIG. 7, ninety percent (or 0.9 on a scale of 0.0 to 1.0) of the CDF should have been completed (delivered if the CDF measures the CDF of packet delays) by time="$T_1$". In the example given in FIG. 7, the observed values shown in the curve 704 exceed this expectation, that is, more than ninety percent of packets were delivered by time="$T_1$". Therefore, the observed CDF values of curve 704 exceed the minimum thresholds established by the requirement CDF curve 702.

In some applications, plots like the plot 700 of FIG. 7 can be used to determine whether packets transmitted by an application (in a UE) or by the network are meeting or exceeding their packet delivery expectations. In some embodiments, the dominant QoS metrics determined and shown in the table of FIG. 6 (for the different traffic types) can be applied to the plot of FIG. 7 and can then be used to determine whether the metric is behaving acceptably or unacceptably.

The flowchart of processes shown in FIG. 4 can now be described in more detail. As shown in FIG. 4, the flowchart and processes 400 comprise an EPC Core 402, a CBSD (or more simply, an Access Point (AP)) 404, and a UE 406. Each of these components/processes include Observation Points (or "OPs"), such as the EPC OP 402a and the EPC OP 402b, the CBSD OP 404a and CBSD OP 404b, the UE OP 406a and UE OP 406b. The various Observation Points observe and measure specified metrics for their respective component/process. More specifically, the EPC OPs measure metrics for the EPC Core 402, the CBSD OPs measure metrics for the CBSD 404, and the UE OPs measure metrics for their associated UE 406. Packet transmission metrics can be observed by the various OPs and provided as input to the other processes shown in FIG. 4. As is also shown in FIG. 4, both active ΔQ and passive ΔQ measurements are provided by the ΔQ Measurement processes 408 and 410, respectively. These active and passive ΔQ measurements are provided as input to the Observed CDF process 412. In accordance with the present method and apparatus, the Observed CDF is compared to a Predicted CDF 414, and the differences between the observed and predicted CDFs are recorded as "errors" in the error process 416.

Any and all deviations between the observed CDF (412) and the predicted CDF (414) result in "errors". These errors, or deviations, are fed back by the Error process 416 to a "Backporp/Gradient Descent" process 418, which is then fed back as input to a Training process 420. The feedback architecture causes the Training process 420 to update the Predicted CDF 414 accordingly. As those skilled in the artificial intelligence and machine learning arts will appreciate, a machine learning technique is used to apply the Backporp/Gradient Descent process 418 to update the Predicted CDF 414. The ultimate goal is to continually update the Predicted CDF 414 so that it eventually gets closer and closer to the Observed CDF 412, and eventually "mimics" the Observed CDF 412. We wish to improve the CDF accordingly. The Application Experienced/QED process 422 is adjusted based on user experience and Enterprise IT preference. This is then compared to the ΔQ in process 424 and these results are used to determine whether the SLA criteria is being met or not. This SLA criteria determination is made at the SLA criteria process 426. As long as the predicted CDF does not stray too far from the observed CDF, the disclosed method and apparatus should properly meet the expected SLA criteria.

SUMMARY

The above-described method and apparatus for seamless real-time transitions across EN-LTE and Wi-Fi networks achieve the desired capabilities, functions and advantageous properties described briefly above in the Background section of the present disclosure. More specifically, the present method and apparatus for seamless real-time transitions across EN-LTE and Wi-Fi networks provide the following technical advantages and benefits, Communications Client Application (CCA) and Communications Server Application (CSA) advantageous capabilities and properties:

Capabilities and Properties of a Communications Client Application (CCA) Allowing Seamless Transmissions in an Enterprise Network for LTE/Wi-Fi Transitions in Accordance with the Present Method and Apparatus On the Client side, typically residing and operating within the UE, the Communications Client Application (CCA) described above:

1) Supports two VPN tunnels, one each for seamless communications over LTE and Wi-Fi, and manage the routing tables to support using the appropriate VPN tunnel;
   i. This feature assumes that the Communications Server Application (CSA) provides the same TIA (Tunnel Inner Address) based on user identity for both VPN tunnels established over the LTE and the W-Fi networks.
   ii. If two VPN tunnels cannot be supported, then the CCA supports transitioning the VPN tunnel from one RAT to the other;
2) Allows for the user/enterprise-IT to specify the LTE and the Wi-Fi operating preferences for each application;
   i. Allows for specifying the default preference when no specification is provided for an application; and
3) Allows for the signal strength to be retrieved for the LTE and the Wi-Fi in real-time
   i. Allow for specifying the relative signal strength levels for transitioning the traffic across the LTE and the Wi-Fi. It is allowed for this to be specified independently for applications that require seamless transitions and other applications for which seamless transitions are optional.

The method and apparatus described above also teaches a smartphone Communications Client Application (CCA) that has the following additional capabilities:

1) Allows for detecting the congestion level over LTE and Wi-Fi networks
   (i) Allow for specifying the relative thresholds that require transitioning the traffic across the LTE and the Wi-Fi;
2) Supports regulation of EUD traffic over the appropriate RAT based on the application priorities subject to signal strength and congestion experienced.
   i. Traffic can be sent:
      a. directly over the LTE IP address, or
      b. directly over the Wi-Fi IP address, or
      c. over a VPN tunnel with the packet routed over the LTE, or
      d. over a VPN tunnel with the packet routed over the Wi-Fi
3) Determine that the UE is operating on a CBRS Enterprise Network using specific signatures of the credentials;
   a. Initially assumes that the UE is always connected to the EN and will not be associated with the MNO network.

Capabilities and Properties of a Communications Server Application (CSA) Allowing Seamless Transmissions in an Enterprise Network for LTE/Wi-Fi Transitions in Accordance with the Present Method and Apparatus On the server side, or the EN "network" side, the method and apparatus described above allow for development of an orchestration platform for the enterprise-IT to manage the devices via the Communications Client Application (CCA) (in the UE) from the Communications Server Application (CSA) that resides in the network. The method and apparatus of the present disclosure provides an integration with the MDM platform and addresses aspects not covered by the MDM to provision policies for EUD behaviors. In accordance with the teachings above, the management platform accommodates iOS and Android devices. In some embodiments, a Device provisioning platform is based on the device's OEM. The initial phase may support the CCA with default configuration without explicit control from the CSA.

A Communications Server Application (CSA) has been described that provides the following technical advantages and benefits:

(1) The CSA provides a TIA for the VPN tunnel being established. Once a VPN tunnel is established over the RAT (LTE/Wi-Fi), the CSA provides the same TIA when the VPN tunnel has established the same credentials on the other RAT (Wi-Fi/LTE);

(2) The CSA routes the packets on the DL (downlink) based on the preferences exercised by the CCA for routing the traffic on the UL (uplink) and reflects that on the DL;

i. When a VPN tunnel is established over both the LTE and the Wi-Fi, the CSA described above determines the least congested network on the DL for routing the packet over the appropriate RAT when the application is operating over the VPN tunnel;

(3) The CSA described above encapsulates the packet delivered on the DL based on the outer IP address associated with the RAT over which the packet is to be sent; and (4) The CSA described above de-encapsulates the packet received on the UL by removing the outer IP address and forwarding the packet to the Intranet/Internet.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus for seamless real-time transitions across LTE and Wi-Fi networks, comprising:

a) a User Equipment (UE) comprising a Communications Client Application (CCA), a single Virtual Private Network (VPN) tunnel, and a plurality of UE Applications; wherein the CCA routes packets to and from the plurality of UE Applications, and wherein packets requiring seamless communications are routed through the single VPN tunnel; and wherein the CCA determines whether to transmit or receive packets using Long Term Evolution (LTE)/NR (New Radio) or Wi-Fi; and wherein UE Applications not requiring seamless communications have their packets routed by the CCA directly using the LTE/NR or the Wi-Fi; and b) an enterprise network comprising a Communications Server Application (CSA), the single VPN tunnel included in the UE, a server LTE/NR access point, and a server Wi-Fi access point; wherein the enterprise network communicates with an Intranet/Internet and is able to receive packets from and send packets to the Intranet/Internet; wherein the CSA routes Intranet/Internet packets requiring seamless communications through the single VPN tunnel; and wherein the CSA determines whether to transmit or receive packets using either the server LTE/NR access point or the server Wi-Fi access point; and wherein Intranet/Internet packets that do not require seamless communications are routed by the CSA directly through either the server LTE/NR access point or server Wi-Fi access point.

2. The apparatus for seamless real-time transitions across LTE and Wi-Fi networks of claim 1, wherein the CCA controls a UE route table, and wherein the CCA manipulates the UE route table as necessary to determine how packets are routed within the UE and with the enterprise network using either an LTE or a Wi-Fi network.

3. The apparatus for seamless real-time transitions across LTE and Wi-Fi networks of claim 1, wherein the CSA controls a server route table, and wherein the CSA manipulates the server route table as necessary to determine how packets are routed within the enterprise network and with the UE using either an LTE or Wi-Fi network.

4. The apparatus for seamless real-time transitions across LTE and Wi-Fi networks of claim 1, wherein the single VPN tunnel comprises a communications construct through which packets requiring seamless communication between the plurality of UE Applications and the Intranet/Internet are transmitted.

5. The apparatus for seamless real-time transitions across LTE and Wi-Fi networks of claim 4, wherein the single VPN tunnel provides VPN tunneling functionality between the CCA and the CSA, and between the plurality of UE Applications and the Intranet/Internet, no matter whether packets are communicated via an LTE network or a Wi-Fi network.

6. An apparatus for seamless real-time transitions across LTE and Wi-Fi networks, comprising:
   a) a User Equipment (UE) comprising a Communications Client Application (CCA), an Long Term Evolution (LTE) Virtual Private Network (VPN) tunnel for communications of packets via LTE, a Wi-Fi VPN tunnel for communications of packets via Wi-Fi, and a plurality of UE Applications; wherein the CCA routes packets to and from the plurality of UE Applications, and wherein packets requiring seamless communications are routed through either the LTE VPN tunnel or the Wi-Fi VPN tunnel; and wherein the CCA determines whether to transmit or receive packets over LTE/NR or over Wi-Fi; and wherein UE Applications not requiring seamless communications have their packets routed by the CCA directly through either the LTE/NR or the Wi-Fi; and
   b) an enterprise network comprising a Communications Server Application (CSA), the LTE VPN tunnel and the Wi-Fi VPN tunnel included in the UE; wherein the enterprise network communicates with an Intranet/Internet and is able to receive packets from and send packets to the Intranet/Internet; wherein the CSA routes Intranet/Internet packets requiring seamless communications through either the LTE VPN tunnel or the Wi-Fi VPN tunnel; and wherein the CSA determines whether to transmit or receive packets using either LTE/NR or Wi-Fi; and wherein Intranet/Internet packets that do not require seamless communications are routed by the CSA directly through either LTE/NR or Wi-Fi.

7. The apparatus for seamless real-time transitions across LTE and Wi-Fi networks of claim 6, wherein the UE further comprises a UE route table, and wherein the CCA manipulates the UE route table as necessary to determine how packets are routed within the UE and with the enterprise network using either an LTE or a Wi-Fi network.

8. The apparatus for seamless real-time transitions across LTE and Wi-Fi networks of claim 7, wherein the enterprise network further comprises a server route table, and wherein the CSA manipulates the server route table as necessary to determine how packets are routed within the enterprise network and with the UE using either the LTE or Wi-Fi network.

9. The apparatus for seamless real-time transitions across LTE and Wi-Fi networks of claim 7, wherein the CCA:
   a) supports both the LTE VPN tunnel and the Wi-Fi VPN tunnel for seamless communications over the LTE network and the Wi-Fi network, respectively;
   b) controls the UE route table to support using the appropriate LTE VPN and the Wi-Fi VPN tunnels;
   c) permits user/enterprise-IT to specify the LTE and the Wi-Fi operating preferences for each UE application;
   d) allows for received signal strength information to be retrieved from the LTE and the Wi-Fi networks in real-time;
   e) allows for detecting a congestion level on both the LTE and the Wi-Fi networks;
   f) provides support for regulating EUD traffic over an appropriate RAT based on a selected UE application's priorities and subject to received signal strength and congestion experienced on the LTE and the Wi-Fi networks; and
   g) determines that the UE is operating on a (Citizen Band Radio Service (CBRS) enterprise network using specific signatures and associated credentials.

10. The apparatus for seamless real-time transitions across LTE and Wi-Fi networks of claim 7, wherein the CSA:
   (a) provides a Tunnel Inner Address (TIA) for each VPN tunnel that is established in the UE and in the enterprise network;
   (b) routes packets transmitted on a downlink (DL), communications transmitted by the enterprise network to the UE, based on preferences exercised by the CCA for routing traffic on an uplink (UL), communications from the UE to the enterprise network;
   (c) encapsulates packets delivered on the DL based on an outer Internet Protocol (IP) address associated with a Radio Access Technology (RAT) over which the packet is transmitted; and
   (d) de-encapsulates packets received on the UL by removing an outer IP address and forwarding the packet to the Intranet/Internet.

11. The apparatus for seamless real-time transitions across LTE and Wi-Fi networks of claim 10, wherein a selected UE application uses only one IP address to transmit packets to the enterprise network, and this one IP address remains the same whether the packet is routed to the enterprise network over the LTE network or the Wi-Fi network.

12. The apparatus for seamless real-time transitions across LTE and Wi-Fi networks of claim 11, wherein the TIA comprises an IP address assigned by the selected UE application.

13. The apparatus for seamless real-time transitions across LTE and Wi-Fi networks of claim 6, wherein the LTE VPN and the Wi-Fi VPN tunnels are simultaneously established.

14. The apparatus for seamless real-time transitions across LTE and Wi-Fi networks of claim 6, wherein the routing of packets through the LTE VPN and the Wi-Fi VPN tunnels are dynamically controlled by both the CCA and the CSA acting in concert together.

15. The apparatus for seamless real-time transitions across LTE and Wi-Fi networks of claim 6, wherein seamless communication packets transmitted between the UE and the enterprise network via LTE are transmitted through the LTE VPN tunnel, and wherein seamless communication packets transmitted between the UE and the enterprise network via Wi-Fi are transmitted through the Wi-Fi VPN tunnel.

* * * * *